(12) United States Patent
Langdale

(10) Patent No.: US 6,925,961 B2
(45) Date of Patent: Aug. 9, 2005

(54) PET LITTER APPARATUS

(76) Inventor: Dennis M. Langdale, P.O. Box 454, Wrightwood, CA (US) 92397

( * ) Notice: Subject to any disclaimer, the term of this patent is extended or adjusted under 35 U.S.C. 154(b) by 0 days.

(21) Appl. No.: 10/683,673

(22) Filed: Oct. 14, 2003

(65) Prior Publication Data

US 2005/0076845 A1    Apr. 14, 2005

(51) Int. Cl.$^7$ .............................................. A01K 29/00
(52) U.S. Cl. .................. 119/166; 119/168; 119/161; 119/529; 209/352; 209/365.2; 209/379; 209/374; 209/258; 241/83; 312/210.5
(58) Field of Search ................ 119/161–162, 164–166, 119/168, 442, 451, 458, 470, 528–530; 241/83; 312/210.5; 209/352, 258, 379, 374, 365.2

(56) References Cited

U.S. PATENT DOCUMENTS

| | | | | |
|---|---|---|---|---|
| 3,194,397 A | * | 7/1965 | Taege | 209/394 |
| 3,908,597 A | * | 9/1975 | Taylor | 119/166 |
| 4,602,593 A | * | 7/1986 | Gross | 119/166 |
| 4,616,598 A | * | 10/1986 | Burniski et al. | 119/166 |
| 4,970,987 A | | 11/1990 | Deyle | |
| 5,267,530 A | * | 12/1993 | Zamoyski | 119/166 |
| 5,325,815 A | * | 7/1994 | Gumpesberger | 119/166 |
| 5,503,110 A | | 4/1996 | Miller | |

FOREIGN PATENT DOCUMENTS

| | | | | |
|---|---|---|---|---|
| DE | 4301468 A1 | * | 7/1993 | A01K 1/015 |
| EP | 326069 A1 | * | 8/1989 | A01K 67/033 |
| FR | 2658097 A1 | * | 8/1991 | B07B 1/12 |

* cited by examiner

Primary Examiner—Peter M. Poon
Assistant Examiner—Andrea M. Valenti
(74) Attorney, Agent, or Firm—Boniard I. Brown

(57) ABSTRACT

A pet litter apparatus has an upper screen to retain litter and debris, a plurality of upper bars, a lower plurality of bars, mechanism for lowering the lower plurality of bars to define spaces for passage of particulate matter between the upper and lower bars, by rotating rods on sprockets to lower the second plurality of bars.

15 Claims, 4 Drawing Sheets

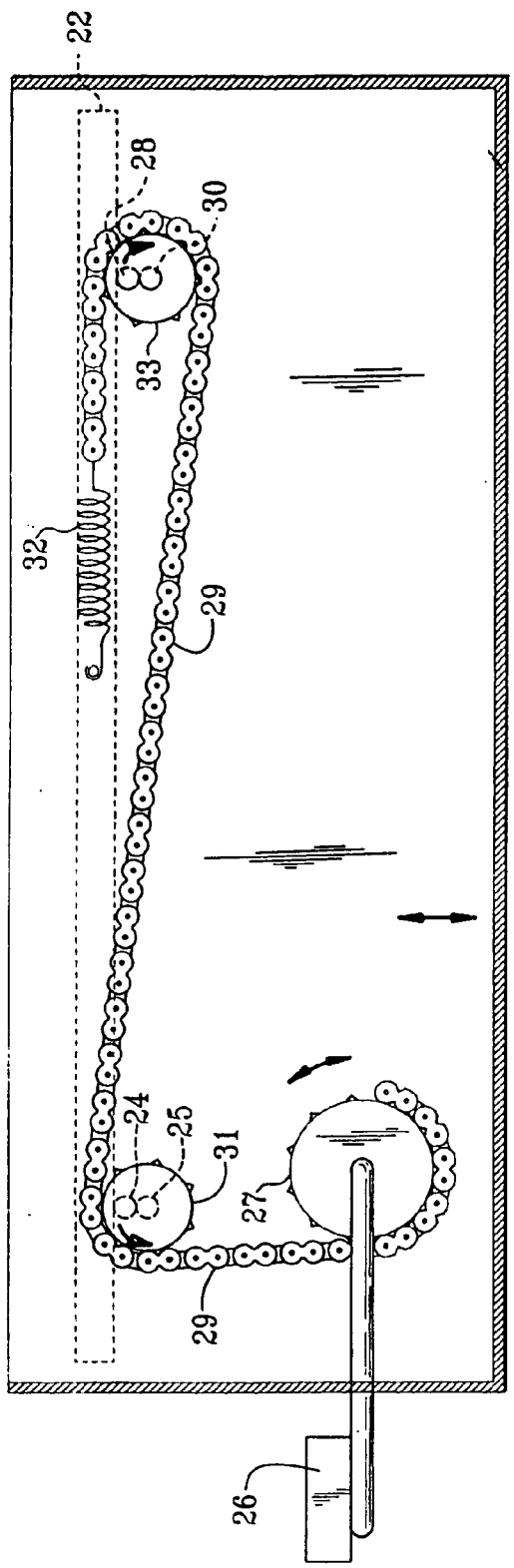
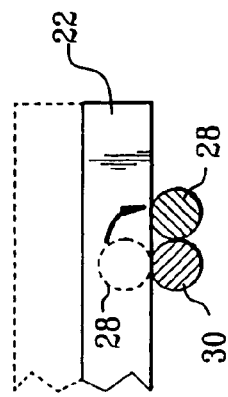
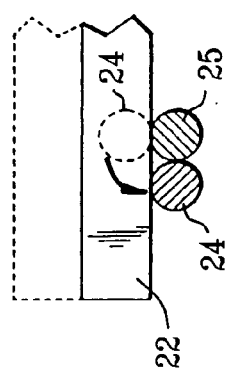
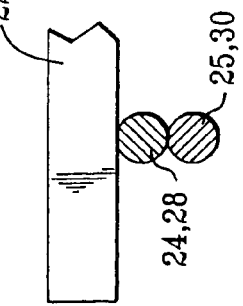

PET LITTER APPARATUS

BACKGROUND AND SUMMARY OF THE INVENTION

Although many kinds of apparatus have been devised and utilized for the convenient handling and disposal of animal waste products, typically cat litter, there has existed a need for a conveniently operable apparatus for the handling of litter, debris and the particulate matter or sand utilized to receive the litter. It is desirable that such apparatus be conveniently operable, provide sand on a suitable surface, and provide for the convenient and quick change or passage of the particulate matter to a lower container for re-use or disposal.

The present invention provides such an apparatus for convenient use, to simplify the removal of particulate matter, such as sand for re-use or disposal, and to be conveniently operable to remove the particulate matter or sand from the apparatus.

The apparatus of the invention retains cat litter or fecal matter on an upper screen for disposal.

By simple operation of a lever or pedal, the particulate matter is passed downwardly in the apparatus of the invention to a lower container or tray for disposal or re-use.

A first plurality of generally parallel bars, and a second plurality of generally parallel bars, are disposed in a frame arrangement. A plurality of spaced-apart rotatable sprockets are operated by a drive chain, and first and second pairs of rods are spaced apart on respective spaced-apart sprockets and rotatable with the sprockets between a first orientation wherein the rods of each pair are disposed one above the other to support the second array of bars on the upper rods of each pair, and a second orientation wherein both rods of each pair are the same level, thus to lower the second plurality of bars for passage therebetween of particulate matter. A mechanism, typically including a pedal enables movement of the second plurality of support bars between said first and second orientations.

BRIEF DESCRIPTION OF THE DRAWINGS

FIG. 3 is an elevational view of a drive chain and sprocket assembly utilized with the invention;

FIGS. 4A, 4B, and 4C are partial views of a rods and sprocket adjustment arrangement for the selective raising and lowering of a plurality of bar components according to the invention.

DESCRIPTION OF THE PREFERRED EMBODIMENT

Figure 1:
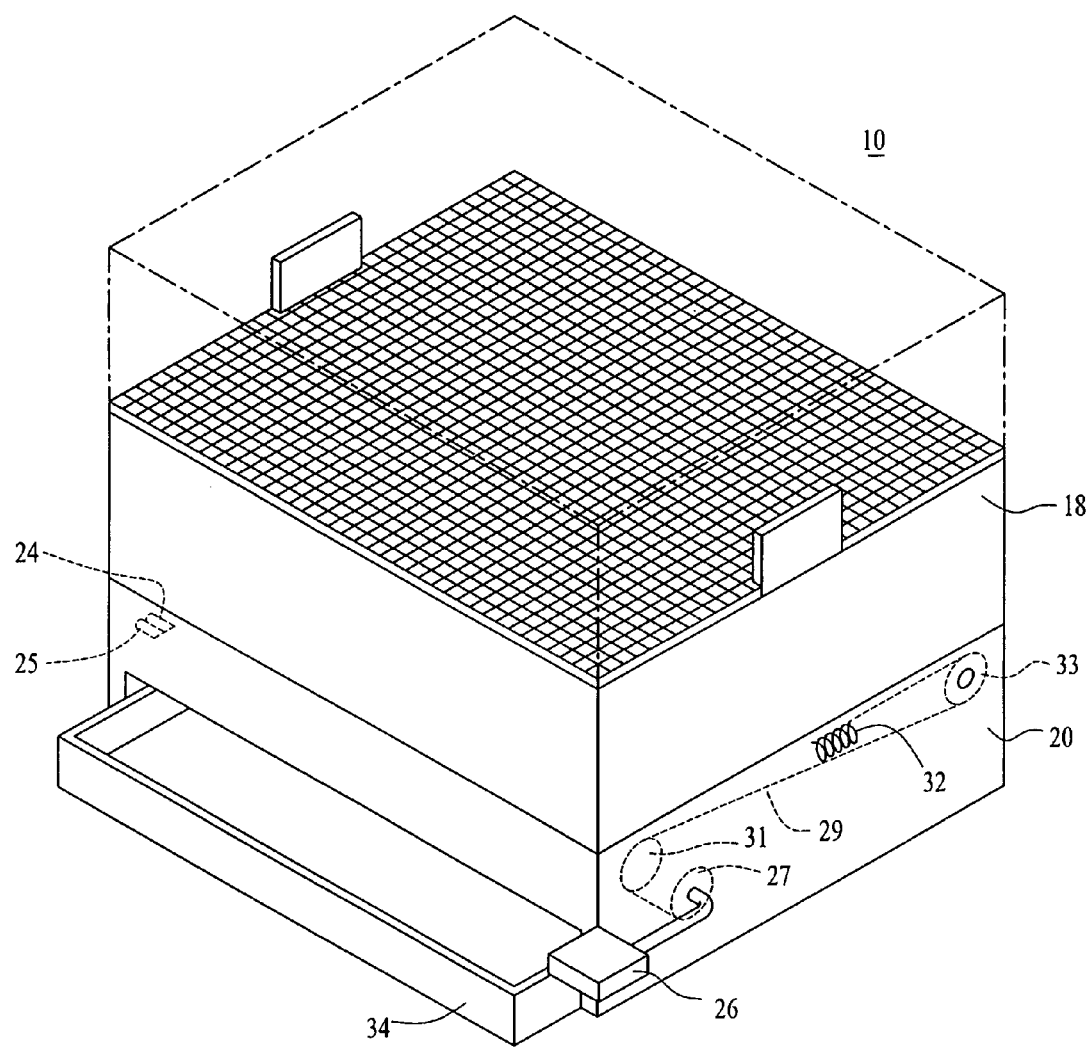
FIG. 1 is a perspective view of a litter apparatus according to the present invention.
Figure 2:
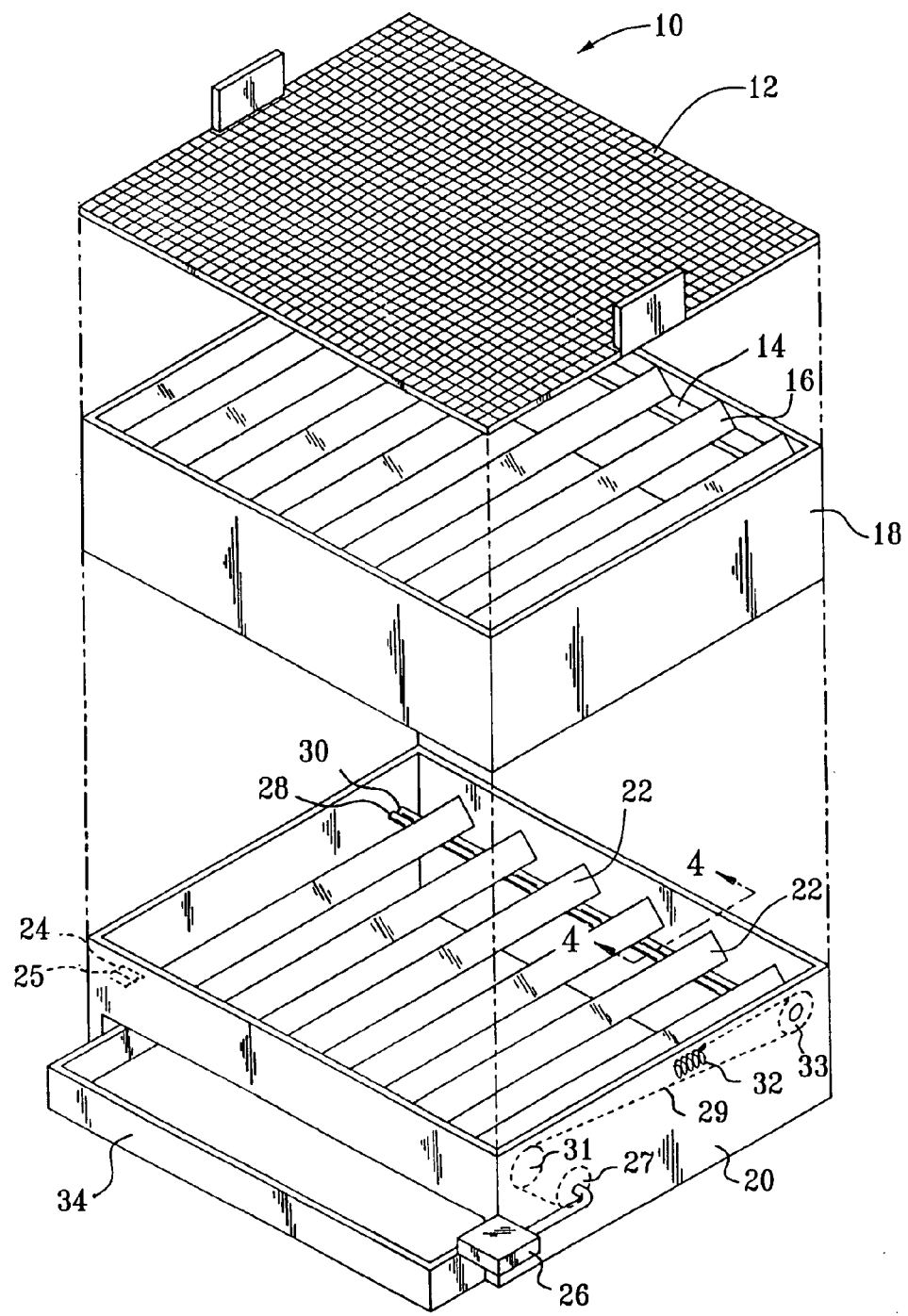
FIG. 2 is an exploded perspective view of the litter apparatus of FIG. 1.

Referring to the drawings, a preferred embodiment 10 of the present invention, as shown in FIGS. 1 and 2, comprises a removable screen 12 supported on a flange 14 which supports bars 16 and an upper frame 18.

A lower frame 20 rotatably supports bars 22 and rods 24, 25, 28 and 30, as shown.

Referring to FIGS. 1, 2 and 3, lower frame 20 has disposed thereon a mechanism for the lowering and raising of the bars 22 by a foot-actuated pedal 26 which is operatively connected with a first sprocket 27, and a drive chain 29 extending about a second sprocket 31 and about a third sprocket 33. Tension in the chain is maintained by a spring 32 connected to the chain, and anchored as shown (FIG. 3).

Depressing the foot pedal 26 rotates the first sprocket 27 to move the drive chain 29 to rotate the second sprocket 31 and the third sprocket 33.

Each of the second sprockets 31 and the third sprockets 33, as shown in FIG. 3, has a pair of rods mounted thereon to extend under and support the lower plurality of bars, as shown in FIG. 2. The respective pairs of rods 24, 25 and 28, 30 extend in spaced-apart relation under the bars 22 to support the bars. The respective pairs of rods are mounted on the respective sprockets 31 and 33 (FIG. 3) and rotatable with their respective sprockets between a first orientation wherein the rods of each pair are disposed one above the other, as indicated in FIGS. 4B and 4C, thus to support the second array of bars 22 in their raised positions on the upper rods of the pairs of rods, and a second orientation wherein both rods of each pair are disposed at the same level, thus to lower the lower second plurality of bars 22 to their positions indicated in FIG. 5B. Operation of the foot pedal effects movement of the lower bars 22 from their upper positions of FIG. 5A to their lower positions of FIG. 5B, thus to define and effect spaces between the bars for the dropping therethrough of the sand into a recovery tray. With the rods 22 in these positions, spaces are defined between the lower plurality of bars 22 and the upper plurality of bars 16, thus enabling the passage of particulate matter, typically sand 36 (FIG. 5A) to fall through the opening defined between the bars 16 and the bars 22 via the spaces between bars effected by the triangular cross-sectional configurations of the bars.

Figure 5A:
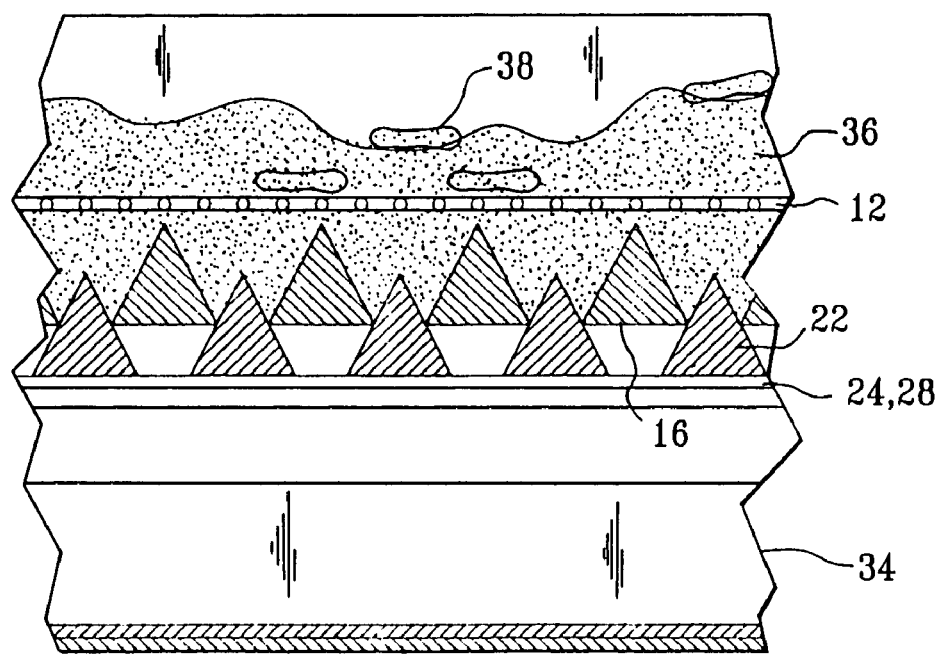
FIGS. 5A and 5B show a plurality of upper bars and a plurality of lower bars in different positional adjustments for either the retaining or the passage therethrough of particulate matter.
Figure 5B:
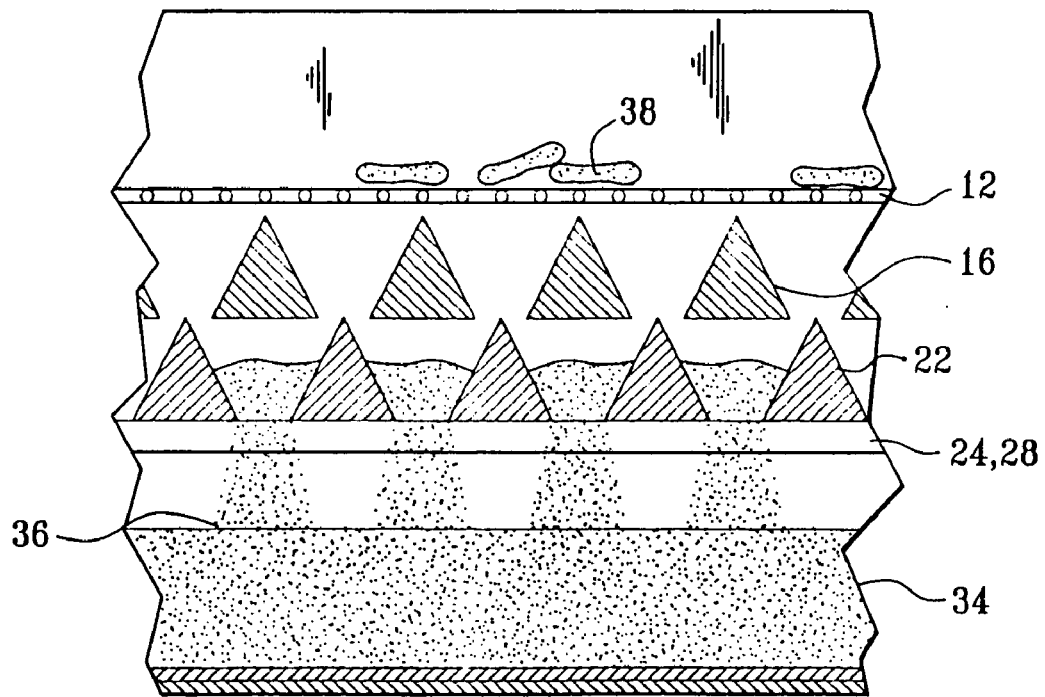

Referring to FIGS. 5A and 5B the apparatus is shown in cross-section before and after the falling of the sand through the screen 12, which retains fecal matter and debris 38 above screen 12, with uncontaminated sand falling to the removable tray 34 for re-use or disposition. FIG. 5B shows the apparatus after sand has fallen through the screen 12, and uncontaminated sand having fallen into removable tray 34 for disposition. The particulate matter falls via the openings between the bars into a container or tray 34 for re-use or disposal.

It will be understood that various changes and modifications may be made from the preferred embodiment discussed above without departing from the scope of the present invention, which is established by the following claims and equivalents thereof.

What is claimed is:

1. Litter disposal apparatus, comprising:
    upper screen means to retain thereon animal litter and debris deposited thereon,
    a first frame mounting a first plurality of generally parallel bars of generally upwardly tapered cross-section,
    a second frame mounting a second plurality of generally parallel bars of tapered cross-sectional configuration,
    sprocket and drive chain means operable to move one of the plurality of bars generally vertically between a first position wherein the second plurality of bars engages the first plurality of bars to prevent passage of particulate matter therebetween, and a second position wherein spaces are defined between bars of the second plurality of bars and bars of the first plurality of bars to pass particulate matter therethrough, and mechanism means operable by a person to move said second plurality of support bars between said first and second positions.

2. Apparatus according to claim 1, wherein said particulate matter is sand.

3. Apparatus according to claim 1, and further comprising:
   a container positioned to receive particulate matter dropped through said spaces between bars of said second plurality of bars for re-use or disposal.

4. Apparatus according to claim 1, wherein said mechanism means to move said second plurality of support bars comprises:
   a plurality of spaced-apart rotatable sprockets,
   a drive chain extending about said sprockets, and
   means operable to rotate said sprockets to move the second plurality of bars for passage of the particulate matter between the first plurality of bars and the second plurality of bars.

5. Apparatus according to claim 4, wherein said means operable to move the second plurality of bars comprises a foot pedal connected with one of said sprockets to move said drive chain and other of the sprockets.

6. Apparatus according to claim 4, wherein said particulate matter is sand.

7. Apparatus according to claim 4, and further comprising:
   a container positioned to receive particulate matter dropped through said spaces between bars of said second plurality of bars for re-use or disposal.

8. Apparatus according to claim 4, wherein said means operable to rotate the sprockets comprises:
   first and second pairs of rods spaced apart and mounted on respective spaced-apart sprockets, and
   respective pairs of the rods being mounted on respective sprockets and rotatable therewith between a first orientation wherein the rods of each pair are disposed one above the other to support the second array of bars on the upper rods of each pair of rods, and a second orientation wherein both rods of each pair are disposed at the same level to lower the second plurality of bars for passage therebetween of particulate matter.

9. Apparatus according to claim 8, wherein said means operable to move the second plurality of bars comprises a foot pedal connected with one of said sprockets to move said drive chain and other of the sprockets.

10. Apparatus according to claim 4, wherein said plurality of sprockets comprises:
    a first sprocket connected with the means operable to rotate the sprockets,
    a second sprocket having two adjacent rods thereon to support the second and lower plurality of bars,
    a third sprocket spaced from the second sprocket and having two adjacent rods thereon,
    upon rotation of the sprockets two spaced-apart pairs of rods under the second plurality of bars are being rotated to cause each pair of rods to be rotated to positions wherein the rods are at the same level to support the second plurality of bars with the two pairs of rods being spaced apart under the bars, and upon rotation of the sprockets the rods are movable into positions wherein one rod is above the other to move the second and lower plurality of bars to lowered positions to permit passage of particulate matter between the first plurality of bars and the second plurality of bars.

11. Apparatus according to claim 10, wherein said means operable to move the second plurality of bars comprises a foot pedal connected with one of said sprockets to move said drive chain and other of the sprockets.

12. Apparatus according to claim 10, and further comprising:
    a container positioned to receive particulate matter dropped through said spaces between bars of said second plurality of bars for re-use or disposal.

13. Litter disposal apparatus, comprising:
    upper screen means to retain thereon animal litter and debris deposited thereon,
    a first frame mounting a first plurality of generally parallel bars of generally upwardly tapered cross-section,
    a second frame mounting a second plurality of generally parallel bars of inwardly tapered cross-sectional configuration,
    a plurality of spaced-apart rotatable sprockets,
    a drive chain extending about said sprockets,
    first and second pairs of rods spaced apart and mounted on respective spaced-apart sprockets,
    respective pairs of the rods being mounted on respective sprockets and rotatable therewith between a first orientation wherein the rods of each pair are disposed one above the other to support the second plurality of bars on the upper rod of each pair of rods, and a second orientation wherein both rods of each pair are disposed at the same level to lower the second-plurality of bars for passage therebetween of particulate matter, and
    mechanism means operable by a person to move said second plurality of support bars between said first and second orientations.

14. Apparatus according to claim 13, wherein said means operable to move the second plurality of bars comprises a foot pedal connected with one of said sprockets to move said drive chain and other of the sprockets.

15. Apparatus according to claim 13, and further comprising;
    a container positioned to receive particulate matter dropped through said spaces between bars of said second plurality of bars for re-use or disposal.

* * * * *